US007695657B2

(12) United States Patent
Toncelli

(10) Patent No.: US 7,695,657 B2
(45) Date of Patent: Apr. 13, 2010

(54) METHOD FOR MANUFACTURING ARTICLES IN THE FORM OF SLABS WITH A SILICEOUS BINDER AND SLABS THUS OBTAINED

(76) Inventor: Luca Toncelli, Viale Asiago 34, Bassano Del Grappa (IT) I-36061

( * ) Notice: Subject to any disclaimer, the term of this patent is extended or adjusted under 35 U.S.C. 154(b) by 51 days.

(21) Appl. No.: 11/782,093

(22) Filed: Jul. 24, 2007

(65) Prior Publication Data

US 2008/0006956 A1 Jan. 10, 2008

Related U.S. Application Data

(63) Continuation of application No. PCT/EP2006/050670, filed on Feb. 6, 2006.

(30) Foreign Application Priority Data

Feb. 14, 2005 (IT) ............ TV2005A000024

(51) Int. Cl.
*B28B 1/08* (2006.01)
(52) U.S. Cl. ............ 264/71; 264/101; 264/9; 264/69; 264/102
(58) Field of Classification Search ........ 264/71, 264/101, 112, 425, 9, 69, 102
See application file for complete search history.

(56) References Cited

U.S. PATENT DOCUMENTS 4,228,826 A * 10/1980 Campbell, Jr. ............ 138/149
4,259,057 A * 3/1981 Abe et al. ............ 425/463
4,265,674 A * 5/1981 Debus et al. ............ 106/730
4,774,045 A * 9/1988 Kushida et al. ............ 264/256
5,264,168 A 11/1993 Toncelli
6,355,191 B1 * 3/2002 Toncelli ............ 264/40.4
6,713,015 B1 * 3/2004 Toncelli et al. ............ 264/660
6,773,641 B1 * 8/2004 Toncelli ............ 264/71
2002/0058140 A1 * 5/2002 Dana et al. ............ 428/375
2003/0129315 A1 * 7/2003 Suyal et al. ............ 427/397.7

FOREIGN PATENT DOCUMENTS

JP 64-37449 2/1989

OTHER PUBLICATIONS

International Search Report and Written Opinion of the International Searching Authority dated Apr. 21, 2006.

* cited by examiner

*Primary Examiner*—Khanh Nguyen
*Assistant Examiner*—Saeed M Huda
(74) *Attorney, Agent, or Firm*—Katten Muchin Rosenman LLP

(57) ABSTRACT

With regard to the technology of compaction by means of vacuum vibrocompression for manufacturing slabs of composite stone, the binder consists of a dispersion of colloidal silica in water and the rough-formed article resulting from the vibrocompression step, undergoes a drying step in order to remove the water present in the vibrocompacted slab. Subsequently the pores of the slab are filled with methyl methacrylate and hardening of the resin is performed by means of heating in hot water.

13 Claims, No Drawings

METHOD FOR MANUFACTURING ARTICLES IN THE FORM OF SLABS WITH A SILICEOUS BINDER AND SLABS THUS OBTAINED

The present invention relates to a novel method for manufacturing conglomerate stone articles, in particular a novel method based on the known technology of compaction by means of vacuum vibro-compression. The present invention also relates to the articles thus obtained.

For many years a technology (which combines a process and a plant) for manufacturing conglomerate stone articles, in particular articles in the form of slabs, has been known. This technology essentially consists of the following operations:

preparing an initial mix consisting of a granulate of chosen and predefined particle size and a binder, which in general terms may be cement-based or consist of a hardening resin, the granulate being chosen from among ground stone materials and/or stone-like materials and this mix partly consisting of an inorganic material, preferably quartz, which is very fine (particle size of about 400 mesh), known as "filler" in industrial practice;

depositing the mix on a temporary support in the form of a layer of predetermined thickness;

applying to the layer of mix, kept under a predefined vacuum, a compaction pressure together with a vibratory movement of predetermined frequency;

hardening the resultant compacted article (preceded by setting in the case of a cement binder).

The present invention relates to the aforementioned technology in the case where the binder is a synthetic resin.

In the aforementioned conventional technology the synthetic resin normally used as a binder is a polyester resin, which gives the product optimum physical/mechanical properties and a glossy appearance and does not have a high cost.

However, the use of polyester resins is accompanied by problems and drawbacks of a not insignificant nature, such as the poor resistance to ultraviolet rays, resulting in a deterioration in the appearance of the surface of the articles when, after being laid, they remain exposed to the sun for a long period of time (yellowing of the resin, loss of transparency, fading of colour). Consequently articles manufactured with polyester resin are little used for external cladding and are mainly restricted to products consisting of stone granulate which is highly coloured and has a non-glossy surface.

As an alternative to polyester resin it would also be possible to use an epoxy resin or, more specifically, an epoxy system, consisting of a resin and the associated hardener, but in practice this alternative solution is affected by various problems and drawbacks from the point of view of industrial application.

Moreover, apart from the fact that the epoxy system has a cost about three times that of a polyester resin, the advantage of a slight increase in the mechanical strength is offset by significant drawbacks such as low resistance to atmospheric agents and to solvents. Moreover, considerable complications arise during hardening of the articles in view of the highly complex management of this reaction.

It would be desirable to be able to apply the aforementioned technology to the manufacture of articles which can be used not only for internal cladding, but also for external cladding, and in which it is possible to use a binder which, in addition to the qualities of polyester resin (ability to provide the article with a high mechanical strength), has an optimum resistance to ultraviolet rays.

Theoretically, the solution to this problem could consist in using an acrylic or methacrylic resin, in view of the exceptional resistance of this class of resins, such as polymethyl methacrylate, to UV rays. It need only be considered that these resins, which are also known by the names of Plexiglas® or Lexan®, are commonly used for the manufacture of lenses for spectacles or transparent sheets with a glass effect precisely because of their exceptional resistance to solar radiation, while retaining their transparency even after very long exposure times.

In the past many attempts have been made to use, as a binder in the aforementioned technology, methacrylate or acrylic resins (in the form of syrups of acrylic prepolymers dispersed in methacrylate) or also mixtures of polyester resins and acrylic resins, but with entirely negative results.

The main reason for this lack of success lies in certain properties of the methacrylate which is always present in these compounds and which has proved to be unsuitable for use both in the vacuum vibro-compaction step and during subsequent hot-hardening.

The methacrylate monomer, which is present in these compounds as a solvent, is very volatile, much more so than the styrene used in the polyester resin. Therefore, during vacuum vibrocompaction the methacrylate evaporates immediately, making compaction of the mix practically impossible.

The use of acrylic syrups also gives rise to equally major drawbacks, since, as a result of evaporation of the methacrylate in the practically air-free environment which is formed during vibrocompaction, the compacted article is completely discoloured.

Further drawbacks arise during the subsequent hot hardening since the heating which precedes hardening causes premature evaporation of the methacrylate with discolouring and cracking of the end product.

A further problem associated with the use of acrylic and methacrylic resins is that of environmental pollution, since human beings are very sensitive to the smell of methacrylate vapours so that these vapours, even in minimum amounts, make the environment absolutely unbearable for the production workers, this being a very serious problem in the case, for example, of an industrial plant for the production of slab articles based on the abovementioned technology.

Therefore, hitherto, the use of conventional acrylic and methacrylic resins, i.e. based on the use of methacrylate monomer as the solvent, has not found a practical application in the abovementioned technology, and the production of the corresponding articles has been performed using exclusively polyester resin as the binder.

It has now been found and this forms the subject of the present invention that the aforementioned problem is entirely solved, in an industrially advantageous manner, using a method for manufacturing articles based on the abovementioned technology and therefore in accordance with the steps indicated above, said method being characterized in that:

the binder used in the preparation of the starting mix is an aqueous dispersion of colloidal silica, namely a dispersion in an aqueous phase of particles of colloidal silica of nanometric size;

after the vacuum vibrocompaction step the rough-formed slab is heated gradually to a temperature of 90÷120° C. for a few hours, preferably 4 to 12 hours, until substantially all the water present in the slab has evaporated, resulting in a rough-formed article which is sufficiently strong to allow handling thereof, but which has a porosity corresponding to the empty spaces left by the mix water removed as a result of evaporation;

the rough-formed slab obtained during the previous step after cooling is impregnated with a resin so as to fill the pores, after which final hardening of the resin is performed.

With regard to the first characteristic feature of the method of the present invention, namely the use, as a binder, of an aqueous dispersion of colloidal silica (also known as silicasol), it consists of a binder which is already used in other sectors, as in the case of foundry sand, which does not require the use of solvent and is particularly valued because it is non-polluting.

However, as is well known, in the case of foundry sand, the aggregation of the sand to form articles such as the so-called cores must have a temporary duration, i.e. until casting of the metal, following which the sand is recovered in loose form.

In the method according to the present invention preferably the filler consists at least partly of clay-like powders such as kaolin or it is preferred to add to the silicasol a material with a viscous or thixotropic action, in particular water-soluble cellulose (preferably 2% of weight relative to the silicasol) or polyvinyl alcohol (whose average molecular weight is preferably 31 000, but can range from 15 000 to 250 000), in order to provide the mix with the plasticity properties which are desirable and also necessary for allowing colouring of the mix and mixing with another differently coloured mix, in order to induce the desired bonding effect between silica and aggregates.

In the preferred embodiment of the method according to this invention the initial mix is deposited in a thin layer on a temporary breathable support so that the layer of mix is enclosed between two sheets of cardboard (for example with a weight of about 300 g/m$^2$).

After vacuum vibro-compression the support together with the slab is transferred onto a metallic screened surface which is perfectly flat, so that the vibro-compacted slab remains enclosed between the two sheets of cardboard and rests on the screened surface.

In this condition this slab is inserted into a drier for the previously mentioned heating step, at the end of which, after cooling, the two outer sheets of cardboard are removed, resulting in an article in the form of a compact and firm slab able to be handled and having sufficient mechanical strength for the handling operations associated with the further process steps (flexural tensile strength of about 10 N/mm$^2$), but also with a porosity of about 10% by volume.

When, as in nearly all the cases, a non-porous article is required, the second qualifying feature of the method according to the present invention is employed, namely impregnation of the slab thus obtained with a hardening resin.

In the preferred embodiment of the present invention methyl methacrylate is used as the resin in view of its exceptional resistance to ultraviolet rays and its low viscosity with a minimum molecular weight, and the techniques already known for concrete articles may be used for impregnation.

In order to perform impregnation, the slabs are loaded into a metal basket, preferably in a vertical arrangement, following which the basket is in turn introduced into a sealed tank inside which preferably a vacuum is created in order to extract the air from the pores of the slabs.

The tank is then supplied with methyl methacrylate to which a thermally activated catalyst with a low molecular weight (such as AIBN for example) and optionally 3-4% by weight of a cross-linking agent of the known type for these resins are added and, at the same time, for a few hours (about 1-2 hours) the slabs are completely impregnated. Upon completion any excess methyl methacrylate is discharged from the tank, transferring it into another suitably cooled storage tank, in order to prevent any initial catalysis of the resin.

The tank containing the baskets, once the methyl methacrylate has been discharged, is filled with water saturated with methyl methacrylate monomer, said water being heated to the temperature of about 75÷90° C., so as to cause hardening of the resin which impregnates the slabs, filling their pores, this step requiring about 1 to 4 hours for completion.

Since the methyl methacrylate monomer possesses a reasonable solubility in water, the aqueous solution saturated with methyl methacrylate present in the tank prevents a part of the methyl methacrylate present in the pores from being dissolved in the water during heating, before hardening is completed.

When the latter has been completed, the aqueous solution is discharged from the tank and then the baskets containing the slabs are unloaded, making sure that a brief suction operation is performed before opening the tank and after discharging the water, in order to eliminate any residual vapours of methyl methacrylate. The aqueous solution is filtered clean of any polymer accumulations and transferred into a storage tank for reuse during a subsequent cycle.

The resultant slabs are than transferred for the usual finishing operations, such as sizing and polishing.

The advantages of the present invention may be better appreciated from the following test results.

A slab consisting of fine sand bonded with polyester resin and compacted by means of vacuum vibrocompression, of the type according to the known art, typically has a formulation, in terms of volume, similar to the following:

| | |
|---|---|
| polyester resin | 19% |
| 400 mesh filler (quartz powder) | 23% |
| quartziferous sand (0.1-1.2 mm) | 58% |

By replacing the polyester resin with an aqueous dispersion of colloidal silica (silicasol), this typically has a water content of about 55÷60%, while the silica is present in an amount equal to 35÷45%. Preferably water-soluble cellulose (2% by weight relative to the weight of the silicasol) is also added to the dispersion of colloidal silica or part of the filler consists of a clay-like powder such as kaolin.

Therefore, the formulation of the mix, in terms of volume, is modified as follows:

| | |
|---|---|
| water | 10% |
| dispersed colloidal silica | 9% |
| 400 mesh filler (quartz powder) | 19% |
| filler (powder kaolin) | 4% |
| quartziferous sand (0.1-1.2 mm) | 58% |

If, after vacuum vibro-compression, the water is eliminated by heating the rough-formed article in the manner already indicated, a compact article possessing mechanical strength, but a porosity of about 10% by volume, corresponding to the empty spaces left by the evaporated water, is obtained.

In accordance with the preferred embodiment of the invention, the rough-formed slab from which the water has been removed and the cardboard sheets eliminated after cooling (for example by means of tearing) is saturated with methyl methacrylate and treated in the manner indicated above, namely heating to about 75÷90° C., while the slab is left immersed in water saturated with methyl methacrylate, producing a slab with the following characteristics:

flexural tensile strength greater than 50 N/mm$^2$;

very limited porosity with absorption of water by weight equal to less than 0.4%;

high resistance to UV rays, confirmed by the absence of signs of deterioration after remaining 1000 hours in the accelerated ageing instrument known as a "veterometer".

In addition to the advantages demonstrated by the above properties, the ecological and environmental compatibility of the use of an acrylic binder in the manner described must be emphasized, the release of monomer vapours into the environment being prevented. Equally important is the possibility, provided by the methyl methacrylate, of pigmentation for imparting particular chromatic effects to the product.

Moreover, it should be noted that the resultant slab consists of 90% by volume siliceous material and 10% organic binder which, moreover, is absolutely non-degradable under the action of UV rays.

According to the present invention it is also possible to envisage the addition, to the formulation of the mix, of an organofunctional silane, in an amount equal to 1-2% by weight relative to the acrylic resin. In this way the adhesion between the acrylic binder and the siliceous aggregates is improved and ultimately the mechanical strength of the final article is increased.

The invention has been described in relation to a preferred embodiment, it being understood that conceptually equivalent variants and modifications are possible and may be envisaged without departing from the scope of the appended claims.

The invention claimed is:

1. Method for manufacturing articles in the form of slabs, the method comprising the steps of:
   (a) preparing an initial mix consisting of a granulate with a selected and predefined particle size and a hardening binder, the granulate being chosen from ground stone materials and/or stone-like materials;
   (b) depositing the mix on a temporary support to form a layer having a predetermined thickness;
   (c) subjecting the layer to a predefined vacuum and simultaneously applying a compaction pressure together with a vibratory movement of predetermined frequency to obtain a compacted rough-formed slab;
   (d) hardening of the binder present in said compacted rough-formed slab;
   wherein the binder in step (a) comprises a dispersion of colloidal silica, the dispersion being an aqueous phase of particles of colloidal silica with a nanometric size; and
   wherein after step (c) the resultant rough-formed slab is heated gradually to a temperature of 90 to 120° C. until substantially all the water present in the slab has evaporated.

2. Method according to claim 1, wherein, at the end of the step in which the resultant rough-formed slab is heated until substantially all the water present has evaporated, the rough-formed slab is impregnated with a resin in order to fill the pores of the slab and subsequently the resin is subjected to a hardening step.

3. Method according to claim 1, wherein a material with a viscous/thixotropic action is added to said dispersion of colloidal silica in order to control the plasticity characteristics of the mix.

4. Method according to claim 3, wherein said material with a viscous/thixotropic action is chosen from water-soluble cellulose and polyvinyl alcohol.

5. Method according to claim 4, wherein said water-soluble cellulose is added in an amount equal to 2% by weight relative to the colloidal silica.

6. Method according to claim 1, wherein during the said vibrocompression step, which is performed on a breathable temporary support, the mix is arranged between sheets of cardboard.

7. Method according to claim 6, wherein, after the vibrocompression, said temporary support is transferred onto a metallic screened surface and the vibrocompacted rough-formed slab, supported on said screened surface and arranged between said two sheets of cardboard, is introduced inside a drier in order to eliminate the water by means of evaporation.

8. Method according to claim 7, wherein the dried slab, after cooling and elimination of the two sheets of cardboard, is kept under vacuum and impregnated with methyl methacrylate until the pores of the slab are filled, following which hardening of the resin which fills the pores is performed.

9. Method according to claim 8, wherein said hardening is performed while the slab is immersed inside a bath of water saturated with methyl methacrylate by means of heating said bath to a temperature of about 75 to 90° C.

10. Method according to claim 9, wherein the duration of the presence of the slab inside the bath is about 1 to 4 hours and the temperature of the water is preferably 85° C.

11. Method according to claim 8, wherein an organofunctional silane is added to the methyl methacrylate utilized in order to impregnate and fill the pores of the dried slab.

12. Method according to claim 11, characterized in that said organofunctional silane is added to the methyl methacrylate in an amount equal to 1 to 2% by weight relative to the weight of the methyl methacrylate.

13. A method for manufacturing ultraviolet resistant articles in the form of slabs, the method comprising the steps of:
   (a) preparing an initial mix consisting of a granulate with a selected and predefined particle size and a hardening binder, the granulate being chosen from ground stone materials and/or stone-like materials, the binder comprising a dispersion of colloidal silica, the dispersion being an aqueous phase of particles of colloidal silica with a nanometric size;
   (b) depositing the mix on a temporary support to form a layer having a predetermined thickness;
   (c) subjecting the layer to a predefined vacuum and simultaneously applying a compaction pressure together with a vibratory movement of predetermined frequency to obtain a compacted rough-formed slab;
   (d) heating gradually the resultant rough-formed slab to a temperature of 90 to 120° C. from 4 to 12 hours until substantially all the water present in the slab has evaporated
   (e) hardening of the binder present in said compacted rough-formed slab.

* * * * *